United States Patent
Naudot et al.

(10) Patent No.: US 10,941,943 B2
(45) Date of Patent: Mar. 9, 2021

(54) ASSEMBLY FOR TURBOMACHINE COMBUSTION CHAMBER COMPRISING A BOSS AND AN ANNULAR ELEMENT

(71) Applicant: SAFRAN HELICOPTER ENGINES, Bordes (FR)

(72) Inventors: Ludovic Andre Joel Naudot, Angais (FR); Philippe Olharan, Pau (FR); Jean Menet-Haure, Saint Laurent Bretagne (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 500 days.

(21) Appl. No.: 15/320,619

(22) PCT Filed: Jun. 19, 2015

(86) PCT No.: PCT/FR2015/051633
§ 371 (c)(1),
(2) Date: Dec. 20, 2016

(87) PCT Pub. No.: WO2015/197954
PCT Pub. Date: Dec. 30, 2015

(65) Prior Publication Data
US 2017/0198915 A1 Jul. 13, 2017

(30) Foreign Application Priority Data

Jun. 24, 2014 (FR) ........................ 1455862

(51) Int. Cl.
*F23R 3/60* (2006.01)
*F23R 3/00* (2006.01)
*B23P 11/00* (2006.01)
*F23R 3/06* (2006.01)
*F23R 3/46* (2006.01)

(52) U.S. Cl.
CPC .............. *F23R 3/60* (2013.01); *B23P 11/005* (2013.01); *F23R 3/002* (2013.01); *F23R 3/06* (2013.01);
(Continued)

(58) Field of Classification Search
CPC .. F23R 3/002; F23R 3/04; F23R 3/045; F23R 3/06; F23R 3/60; F23R 3/283;
(Continued)

(56) References Cited

U.S. PATENT DOCUMENTS 3,545,202 A * 12/1970 Batt .................... F23R 3/06
60/757
4,132,066 A * 1/1979 Austin, Jr. ................ F23R 3/06
60/752
(Continued)

FOREIGN PATENT DOCUMENTS

EP 0506516 A1 9/1992
EP 1265037 A1 12/2002
(Continued)

OTHER PUBLICATIONS

Atlas Foundry Company, "Fillet All Sharp Angles", accessed at http://www.atlasfdry.com/casting-design7.htm on Jun. 21, 2020, available Jul. 20, 2008 as accessed at the internet archive "wayback machine" on Jun. 21, 2020 at https://web.archive.org/web/20080720000709/http://www.atlasfdry.com/casting-design7.htm (Year: 2008).*
(Continued)

*Primary Examiner* — Scott J Walthour
(74) *Attorney, Agent, or Firm* — Oblon, McClelland, Maier & Neustadt, L.L.P.

(57) ABSTRACT

An assembly for a turbomachine combustion chamber, including a boss for turbomachine combustion chamber, including a tubular body configured to be inserted in a
(Continued)

receiving orifice formed in an annular wall of a flame tube and to accommodate a shank of a connecting pin for connecting the flame tube to an external casing, a first end of the boss including an annular flange configured to prevent radial translational movement of the boss in a first direction, and a second end of the boss being configured to be crimped to the wall of the flame tube so as to prevent radial translational movement of the boss in a second direction, and an annular element configured to fit coaxially with the receiving orifice and in radial contact with the annular wall of the flame tube on the one hand and with the annular flange of the boss on the other.

9 Claims, 5 Drawing Sheets

(52) U.S. Cl.
CPC ............ *F23R 3/46* (2013.01); *B23P 2700/13* (2013.01); *F23R 2900/00018* (2013.01); *F23R 2900/00019* (2013.01)

(58) Field of Classification Search
CPC .. F23R 2900/00012; F23R 2900/00017; F23R 2900/00019; F23R 3/46; F02C 7/20; F02C 7/26; F02C 7/264; F05D 2230/232; F05D 2260/941; B23P 11/005
See application file for complete search history.

(56) References Cited

U.S. PATENT DOCUMENTS

| | | | | |
|---|---|---|---|---|
| 4,700,544 A | * | 10/1987 | Fucci | F23R 3/045 60/757 |
| 5,235,805 A | * | 8/1993 | Barbier | F23R 3/045 60/39.23 |
| 5,253,810 A | * | 10/1993 | Maltby | B05B 9/002 239/397.5 |
| 7,101,173 B2 | * | 9/2006 | Hernandez | F02C 7/266 239/533.12 |
| 10,024,537 B2 | * | 7/2018 | Taylor | F23R 3/002 |
| 2002/0184889 A1 | * | 12/2002 | Calvez | F23R 3/007 60/796 |
| 2002/0189260 A1 | * | 12/2002 | David | F23R 3/045 60/746 |
| 2005/0028528 A1 | | 2/2005 | Hernandez et al. | |
| 2012/0017596 A1 | * | 1/2012 | Rudrapatna | F23R 3/06 60/752 |
| 2012/0297778 A1 | | 11/2012 | Rudrapatna et al. | |
| 2013/0283806 A1 | | 10/2013 | Monaghan et al. | |
| 2014/0083112 A1 | * | 3/2014 | Jause | F23R 3/002 60/782 |
| 2015/0241063 A1 | * | 8/2015 | Bangerter | F23R 3/06 60/754 |

FOREIGN PATENT DOCUMENTS

| | | |
|---|---|---|
| EP | 2826102 A1 | 12/2002 |
| EP | 1489360 A1 | 12/2004 |
| EP | 2527740 A2 | 11/2012 |
| EP | 2657606 A2 | 10/2013 |
| FR | 2996289 A1 | 4/2014 |

OTHER PUBLICATIONS

International Search Report dated Nov. 24, 2015, in PCT/FR2015/051633, filed Jun. 19, 2015.

* cited by examiner

FIG. 1 - state of the art
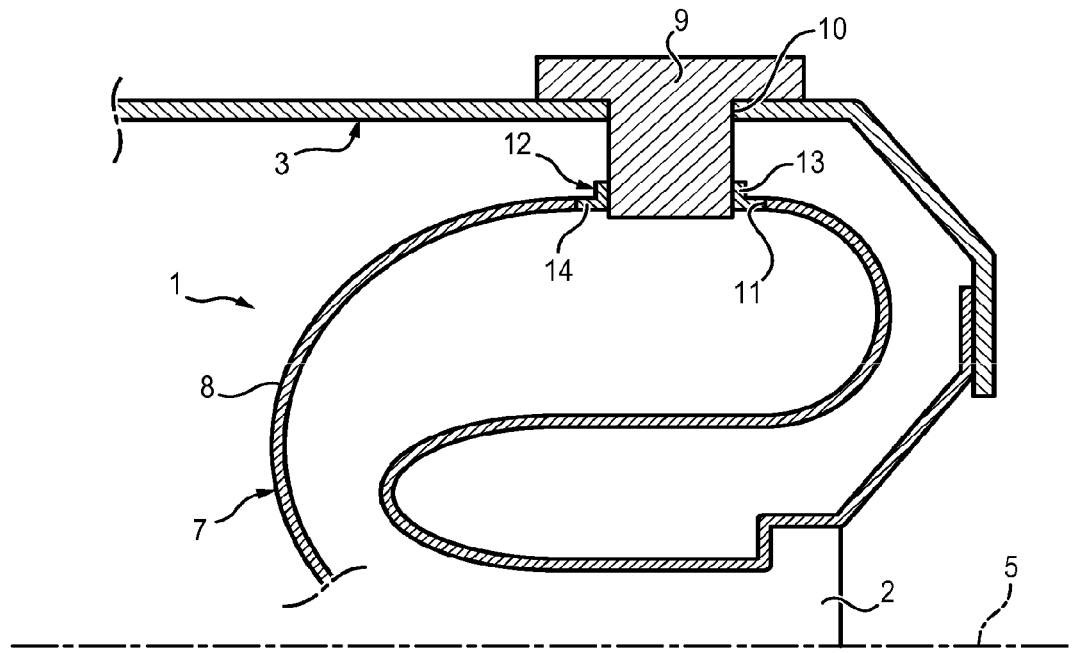
FIG. 2
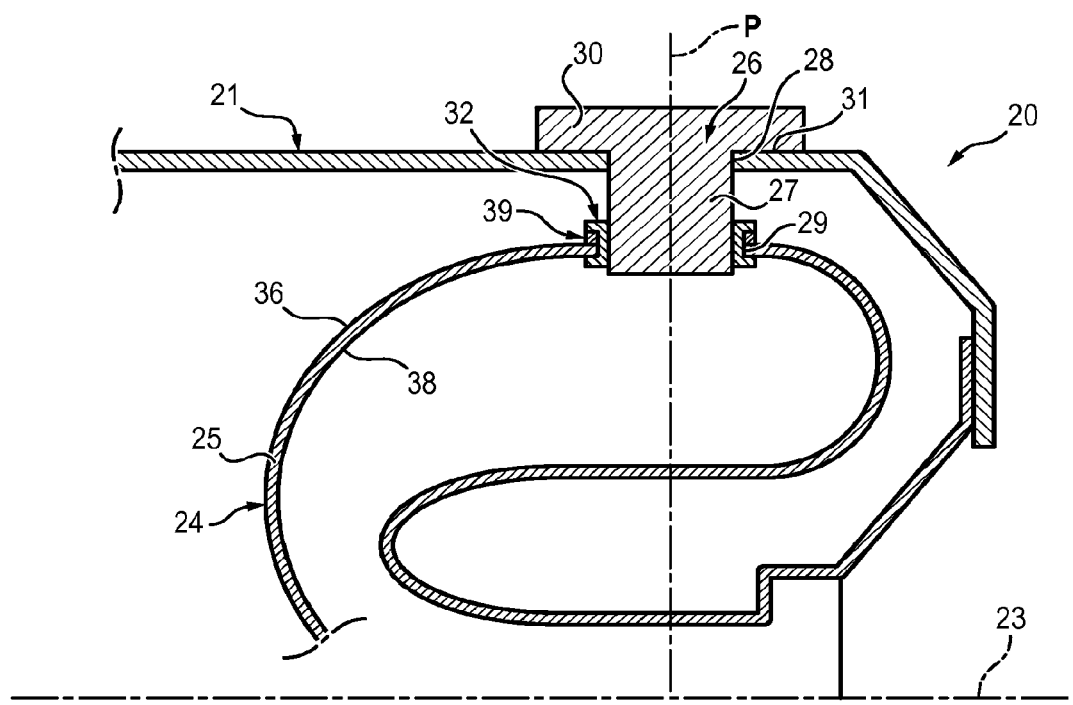

ASSEMBLY FOR TURBOMACHINE COMBUSTION CHAMBER COMPRISING A BOSS AND AN ANNULAR ELEMENT

GENERAL TECHNICAL FIELD

The invention relates generally to the field of combustion chambers for turbine engines, and more particularly to the attachment of a flame tube in a turbine engine combustion chamber.

PRIOR ART

A turbine engine generally comprises, from upstream to downstream in the gas flow direction, a fan, one or more compressor stages, for example a high-pressure compressor and a low-pressure compressor, a combustion chamber, one or more turbine stages, for example a high-pressure turbine and a low-pressure turbine, and a gas exhaust nozzle.

FIG. 1 illustrates a longitudinal section view of a combustion chamber 1 according to the prior art.

The combustion chamber 1 is connected upstream to a compressor (not shown) which supplies the combustion chamber 1 with air under pressure through a diffuser (not shown), and downstream to a distributor 2.

The combustion chamber 1 is delimited by an annular outer casing 3 extending along a longitudinal axis 5. The outer casing 3 is attached to an outer shell of the turbine engine (not shown).

The combustion chamber 1 comprises a "flame tube" or "fireplace recess" 7 which is the seat of gas combustion.

The flame tube 7 is surrounded by an annular air supply conduit which is separated from the flame tube 7 by a wall 8 with a toroidal shape overall.

In the example illustrated in FIG. 1, the flame tube 7 is a "reverse flow" type, and the wall 8 has a bent annular shape allowing the gas flow to be directed downstream in the turbine engine, in the direction of the turbine. The gas flow then occurs in succession from downstream to upstream, then again downstream of the combustion chamber 1. The injectors are generally arranged at the head of the flame tube 7.

The flame tube 7 is connected to the combustion chamber 1 by attachment pins 9 each extending radially in a through insertion port 10 provided in the outer casing 3, and in a through reception port 11 provided in the wall 8 of the flame tube 7 facing the insertion port 10. These attachment pins 9 make it possible to hold the flame tube 7 within the combustion chamber 1.

The reception ports 11 are each provided with a boss 12 having a tubular body 13 inside which the associated attachment pin 9 is slidably mounted so that, when the flame tube 7 expands due to the heat caused by the combustion of the gases, the body 13 of the boss 12 slides along the attachment pin 9. Each of the bosses 12 further comprises, at one of its end, an annular collar 14 TIG (tungsten inert gas) butt-welded and sealed to the reception port 11 of the wall 8 of the flame tube 7.

The use of such bosses 12 has, however, a certain number of disadvantages.

In particular, the operation of welding the bosses 12 to the wall 8 of the flame tube 7 generates strong deformations of the bosses 12 and of the wall 8 of the flame tube 7, making necessary, after the welding operation, sheet metal operations and re-machining of the bodies 13 of the bosses 12, so as to ensure precise positioning of the flame tube 7 relative to the outer casing 3.

Moreover, the annular collar 14 of the bosses 12 is planar overall, and is adapted with difficulty to the contour of the wall 8 of the flame tube 7, so that the bosses 12 do not allow precise positioning of the flame tube 7 relative to the outer casing 3 to be ensured, without re-machining of the bodies 13 of the bosses 12.

In addition, it is compulsory, after the welding operation, the carry out heat treatment and non-destructive testing of the bosses 12 and of the flame tube 7.

These supplementary operations considerably complicate the manufacture of the combustion chamber 1 and make it more costly.

Finally, the friction generated between the bodies 13 of the bosses 12 and the attachment pins 9, when the flame tube 7 expands due to the heat of gas combustion and the bodies 13 of the bosses 12 slide along the attachment pins 9, have a tendency to wear out the bosses 12.

Worn bosses 12 are replaced during maintenance operations. The worn bosses 12 are for example cut away with lasers, then new bosses 12 are positioned and welded to the reception ports 11 of the wall 8 of the flame tube 7. It is then again necessary to carry out sheet-metal operations on the flame tube 7 and the new bosses 12, re-machine the bodies 13 of the new bosses 12, heat treating and non-destructive testing of the new bosses 12 and of the flame tube 7.

The replacement of such bosses 12 is therefore particularly inconvenient and costly.

PRESENTATION OF THE INVENTION

The present invention therefore has as its object to correct the aforementioned disadvantages by proposing an assembly for a combustion chamber comprising a boss and an annular element making it possible to ensure precise positioning of the tube in the combustion chamber while still reducing complexity and manufacturing costs of the combustion chamber.

More precisely, the present invention has as its object an assembly for a turbine engine combustion chamber, comprising:
- a boss for a turbine engine combustion chamber, comprising a tubular body configured to be inserted into a reception port provided in an annular wall of a flame tube and to accommodate a stem of an attachment pin of the flame tube on an outer casing, a first end of the boss comprising an annular collar configured to block radial translation of the boss in a first direction, and a second end of the boss being configured to be crimped to the wall of the flame tube so as to block radial translation of the boss in a second direction, and
- an annular element configured to fit coaxially with the reception port, and in radial contact with the annular wall of the flame tube on the one hand and with the annular collar of the boss on the other hand.

The present invention also has as its object a turbine engine combustion chamber, comprising:
- an annular outer casing extending along a longitudinal axis,
- a flame tube arranged inside the outer casing and comprising an annular wall extending generally along the longitudinal axis, the wall comprising at least one reception port arranged facing the outer casing,
- at least one attachment pin for the flame tube on the outer casing comprising a stem extending through the reception port,
- at least one boss, the boss comprising a tubular body inserted into the reception port, and accommodating the stem of the attachment pin, a first end of the boss comprising an annular collar configured to block a radial translation of the boss in a first direction, and a second end of the boss being crimped to the wall of the flame tube so as to block the radial translation of the boss in a second direction, at least one annular element (39) arranged coaxially with the reception port (29) and in radial contact with the annular wall (25) of the flame tube (24) on the one hand and with the annular collar (35) of the boss (32) on the other hand.

Preferably, the annular element is welded at one or more points to the wall of the flame tube.

Preferably, the annular element is arranged against an outer surface of the wall of the flame tube, and the second end is crimped against an inner surface of the flame tube.

Preferably, the annular element has a contact surface with the wall of the flame tube conforming to the shape of the wall of the flame tube.

More preferably, the annular element comprises an annular collar forming the contact surface with the wall of the flame tube, the annular collar having a land intended to indicate to an operator the orientation of the contour of the contact surface of the annular element.

The present invention also has as its object a turbine engine comprising a combustion chamber as previously described.

The invention also has as its object a method for manufacturing a turbine engine combustion chamber, comprising an annular outer casing extending along a longitudinal axis, and a flame tube arranged inside the outer casing comprising an annular wall extending generally along the longitudinal axis, the method comprising the steps of:

drilling at least one reception port in the wall of the flame tube facing the outer casing, installing at least one annular element coaxially with the or one of the reception ports against the wall of the flame tube, inserting into the reception port(s) and the associated annular element(s) (39) a boss comprising at a first end an annular collar configured to block radial translation of the boss(es) in a first direction, so that the annular collar (35) of the boss(es) (32) bears against the annular element(s) (39), crimping the second end of the boss(es) to the wall of the flame tube, so as to block radial translation of the boss(es) in a second direction.

More preferably, the method comprises, after the step of crimping the boss(es), a step of welding at one or more points of the annular element(s) to the wall of the flame tube.

PRESENTATION OF THE FIGURES

Other features, aims and advantages of the invention will be revealed by the description that follows, which is purely illustrative and not limiting, and which must be read with reference to the appended drawings, wherein:

FIG. 1 (already described) is a longitudinal section view of a combustion chamber according to the prior art;

FIG. 2 is a longitudinal section view of a combustion chamber according to one embodiment of the invention;

Figure 4:
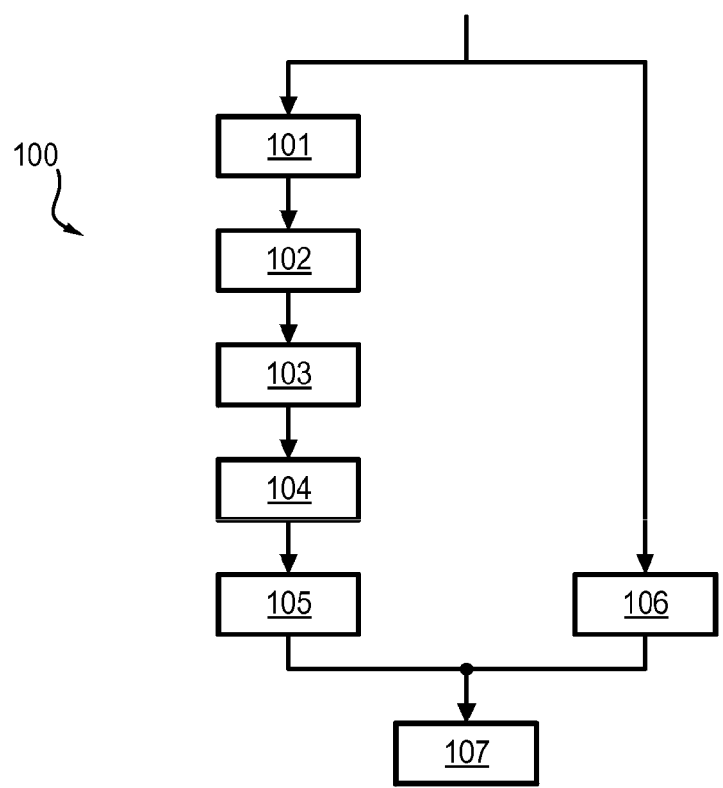
FIG. 4 is a flowchart of a method for manufacturing a combustion chamber according to one embodiment of the invention.
Figure 5:
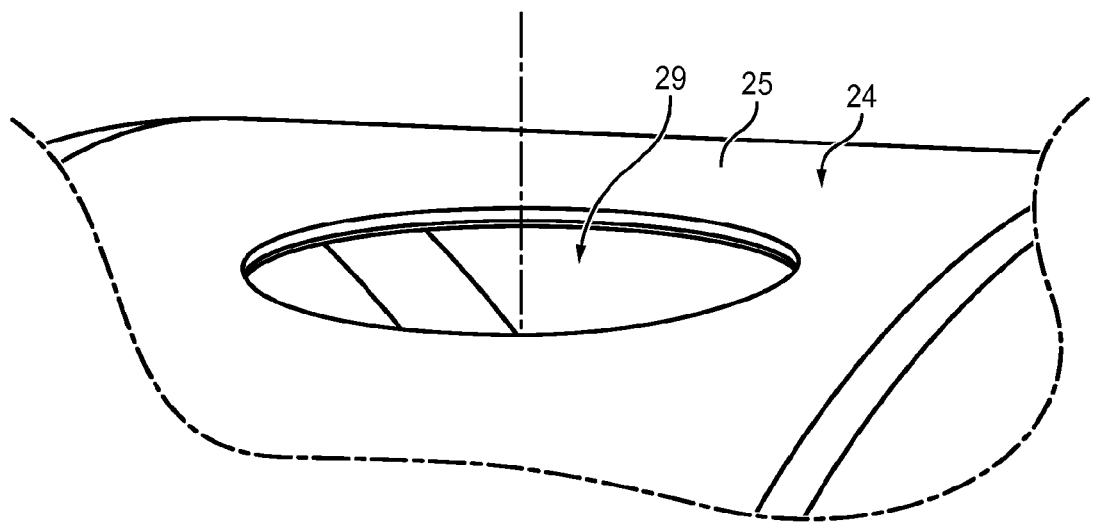
Figure 6:
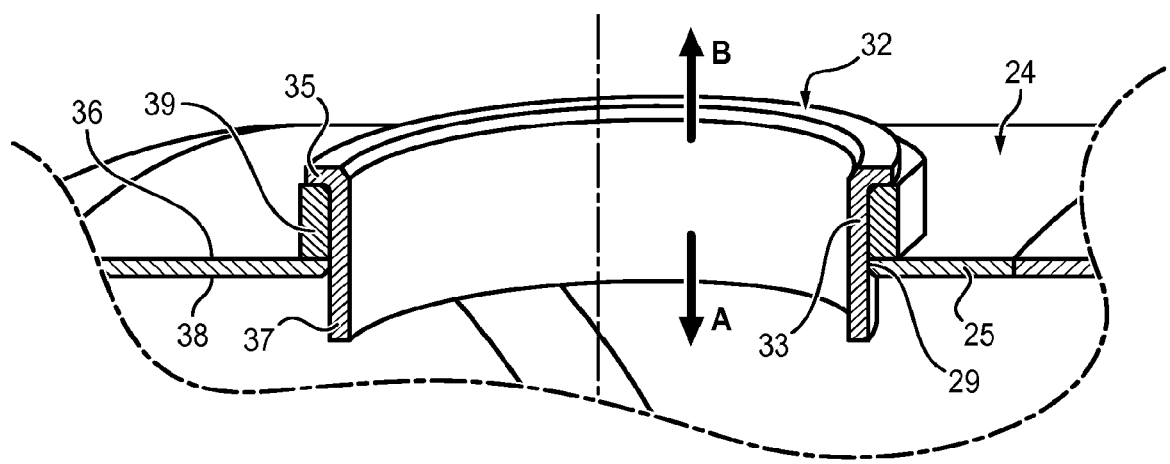
Figure 7:
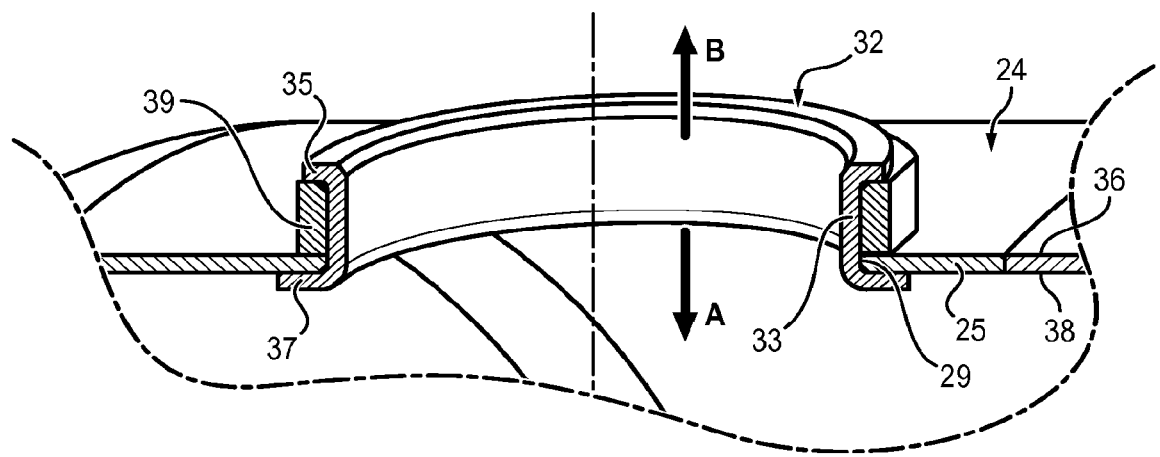
Figure 8:
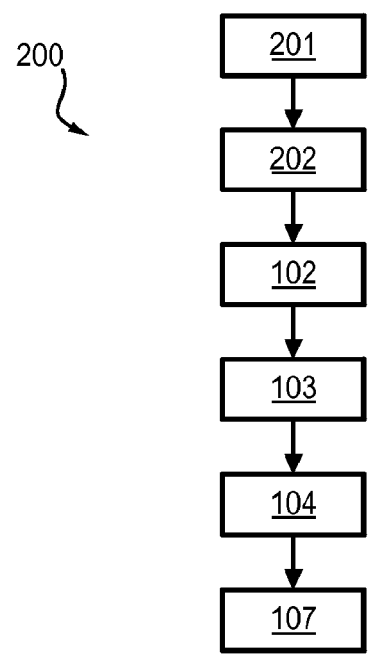
Figure 9:
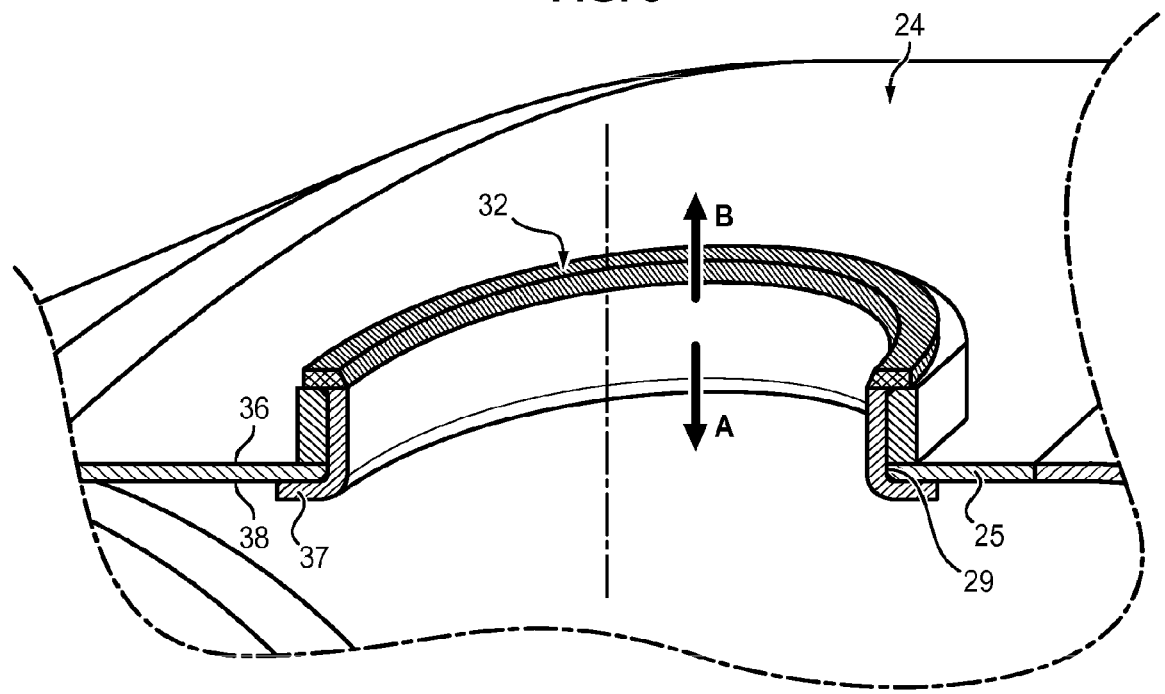
Figure 10:
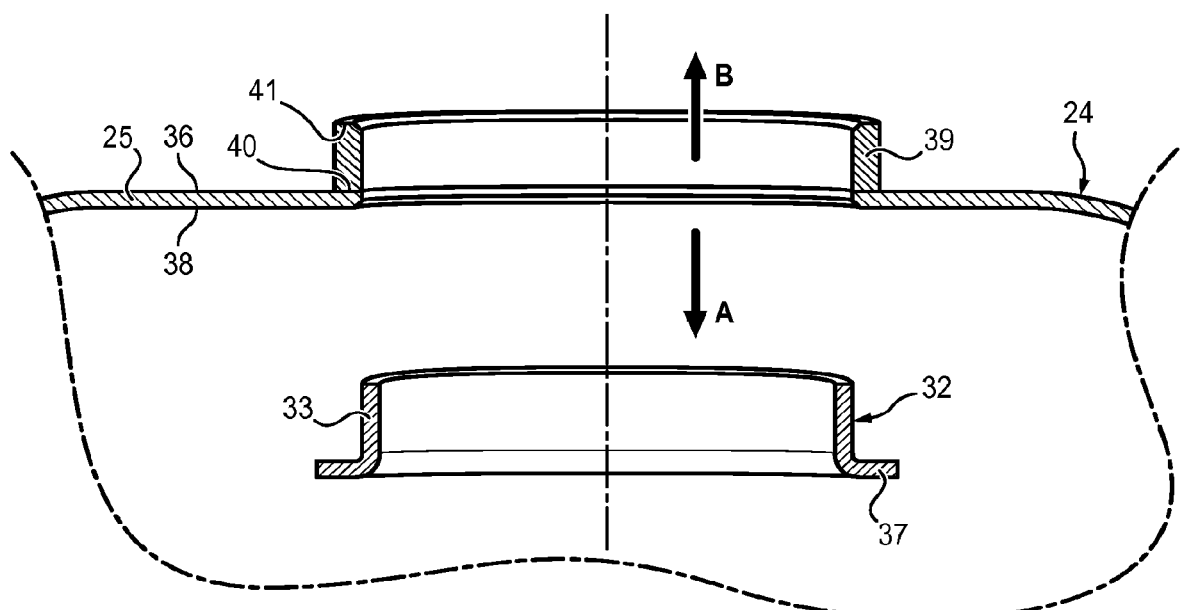

FIGS. 5, 6 and 7 each illustrate one step of the manufacturing method shown in FIG. 4;

FIG. 8 is a flowchart of a method for replacing a boss in a combustion chamber manufactured according to the method shown in FIG. 4;

FIGS. 9 and 10 each illustrate one step of the method shown in FIG. 8.

DETAILED DESCRIPTION

FIG. 2 shows a longitudinal section view of a combustion chamber 20 of a turbine engine according to one embodiment of the invention.

The combustion chamber 20 is connected upstream to a compressor (not shown) which supplies the combustion chamber 20 with air under pressure through a diffuser (not shown), and downstream to a distributor.

The combustion chamber 20 is delimited by an annular outer casing 21 extending along a longitudinal axis 23.

The combustion chamber 20 further comprises a flame tube 24 provided with a wall 25 with a toroidal shape overall extending along the longitudinal axis 23. The wall 25 is provided at a distance from the outer casing 21 so as to form an annular air supply conduit.

In the example illustrated in FIG. 2, the flame tube 24 is of the reverse flow type and the wall 25 has a bent annular shape making it possible to transmit the gas flow downstream in the turbine engine, in the direction of the turbine. The gas flow then occurs in succession from downstream to upstream, then again downstream from the combustion chamber 20. The injectors are then generally arranged at the head of the flame tube 24.

According to a variant (not shown), the flame tube is of the direct flow type and comprises annular walls of revolution connected at an upstream end by a bottom and a shroud comprising fuel injector passage ports carried by the combustion chamber.

The combustion chamber 20 comprises an attachment pin 26 configured to connect the wall 25 of the flame tube 24 to the outer casing 21.

To this end, the attachment pin 26 comprises a stem 27 extending radially in a through insertion port 28 provided in the outer casing 21, and in a through reception port 29 provided in the wall 25 of the flame tube 24 facing the insertion port 28, and a head 30 positioned in abutment against an outer surface 31 of the outer casing 21.

The combustion chamber 20 further comprises a boss 32 comprising a tubular body 33 extending in the reception port 29 and accommodating the stem 27 of the attachment pin 26. The stem 27 is slidably mounted in the body 33 of the boss 32, so that, when the flame tube 24 expands, the body 33 of the boss 32 slides along the stem 27.

The boss 32 is for example made of nickel, of cobalt or of chromium.

Figure 3:
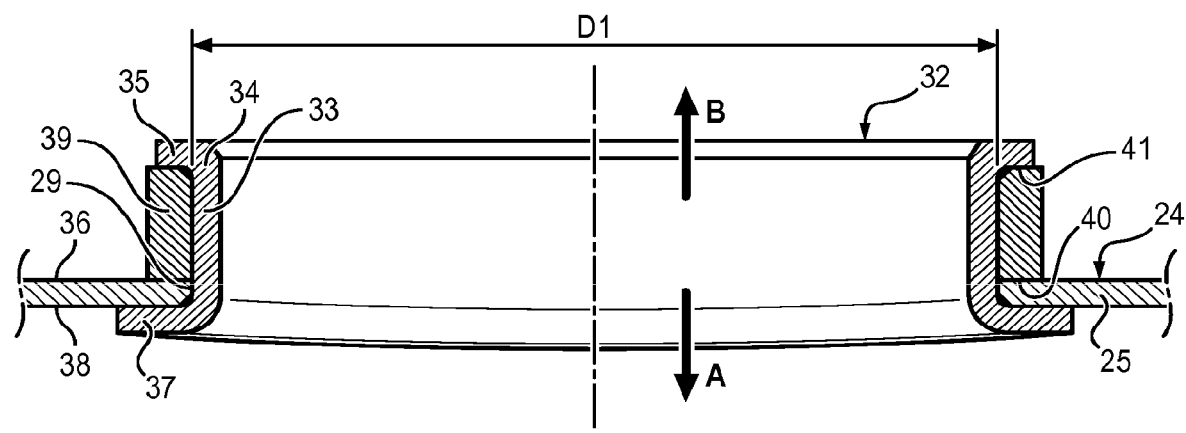
FIG. 3 is a section view, in detail of a boss of the flame tube of the combustion chamber shown in FIG. 2.

The boss 32 shown in FIG. 2 is shown in detail in FIG. 3, prior to the installation of the stem 27 of the attachment pin 26 in the boss 32.

Preferably, an outer diameter D1 of the body 33 of the boss 32 is substantially equal to a diameter of the reception port 29 associated with it.

A first open end 34 of the boss 32 is formed by an annular collar 35 configured to block radial translation of the boss relative to the longitudinal axis 23 in a first direction A, when the boss 32 is inserted into the associated reception port 29. As illustrated in FIG. 3, an outer surface of the body 33 of the boss 32 is for example connected to the annular collar 35 by a fillet, and an inner surface of the body 33 of the boss 32 is for example connected to the collar 35 by a flare.

In the example illustrated in FIGS. 2 and 3, the annular collar 35 of the boss 32 is arranged facing an outer surface 36 of the wall 25 of the flame tube 24. Thus the annular collar 35 blocks radial translation of the boss 32 toward the interior of the flame tube 24.

The boss 32 also comprises, positioned opposite the annular collar 35, a second end 37 crimped to the wall 25 of the flame tube 24, so as to block radial translation of the boss in a second direction B, opposite to the first direction A. The second end 37 is preferably crimped to the wall 25 of the flame tub 24 over its entire circumference.

In the example illustrated in FIG. 2, the second end 37 of the boss 32 is crimped against an inner surface 38 of the flame tube 24. Thus, the crimping 37 of the boss 32 blocks radial translation of the boss 32 toward the outside of the flame tube 24.

Preferably, when it is crimped to the wall 25 of the flame tube 24, the second end 37 of the boss conforms to the shape of the wall 25 of the flame tube 24. In the example shown in FIG. 3, the second end 37 of the boss 32 is contoured so as to mold itself to the concavity of the inner surface 38 of the wall 25 of the flame tube 24. The boss 32 thus mounted in the reception port 29 of the wall 25 of the flame tube 24 makes it possible to ensure precise positioning of the flame tube 24 relative to the outer casing 21 without it being necessary to weld it to the wall 25 of the flame tube 24.

The combustion chamber 20 further comprises an annular element 39 arranged coaxially with the associated reception port 29, in radial contact relative to the longitudinal axis 23 with the wall 25 of the flame tube 24 on the one hand, and with the annular collar 35 of the boss 32 on the other hand.

Thus, the annular element 39 makes it possible on the one hand to protect the wall 25 of the flame tube 24 from the forces exerted on the boss 32 during its assembly, and on the other hand facilitates the crimping of the second end 37 of the boss 32 to the wall 25 of the flame tube 24.

The annular element 39 is for example made of nickel, of cobalt or of chromium.

In the example shown in FIGS. 2 and 3, the annular element 39 is arranged against the outer surface 36 of the wall 25 of the flame tube 24.

The annular element 39 has a contact surface 40 with the wall 25 of the flame tube 24. Preferably, the contact surface 40 conforms to the shape of the wall 25 of the flame tube 24. In the example presented in FIG. 3, the contact surface 40 has a slight concavity so as to mold itself to the convexity of the outer surface 36 of the wall 25 of the flame tube 24.

According to one embodiment of the invention, the annular element 39 comprises an annular collar forming the contact surface 40. The annular collar of the annular element 39 has for example a land intended to indicate to an operator the orientation of the contour of the contact surface 40 of the annular element 39. In this manner, the annular element 39 can be correctly positioned on the wall 25 of the flame tube 24.

The annular element 39 also has an abutment surface 41 against which the annular collar 35 of the boss 32 is in abutment, thus blocking radial displacement of the boss 32 in the first direction A.

The annular element 39 advantageously has a lateral inner surface configured to mold itself to a lateral outer surface of the body 33 of the boss 32. For this purpose, an inner diameter of the annular element 39 is substantially equal to the outer diameter D1 of the body 33 of the boss 32. As illustrated in FIG. 3, the annular element 39 can also have a chamfer between the abutment surface 41 and the lateral inner surface, to face the fillet connecting the lateral outer surface of the body 33 of the boss 32 to the annular collar 35 and thus avoid the risk of interference between the outer surface of the body 33 of the boss 32 and the annular element 39.

The annular element 39 is for example welded to one or more points on the wall 25 of the flame tube 24 so as to maintain the exact position of the boss 32. Such an embodiment is particularly advantageous in the event of replacement of the boss 32 as explained below in the description.

The combustion chamber 20 advantageously comprises several attachment pins 26 to which are associated insertion ports 28, reception ports 29, bosses 32 and annular elements 39 as previously described. Preferably, the attachment pins 26 are arranged in a plane P normal to the longitudinal axis 23. The attachment pins 26 are advantageously distributed equidistantly in the plane P around the flame tube 24.

The manufacture 100 of the combustion chamber 20 takes place according to the following steps illustrated in FIG. 4.

During a first step 101, the reception port 29 is drilled in the wall 25 of the flame tube 24 facing the outer casing 20. The first step 101 is for example illustrated in FIG. 5.

Then, during a second step 102, the annular element 39 is positioned against the wall 25 of the flame tube 24, coaxially with the reception port 29.

The boss 32 is then inserted into the annular element 39 and the reception port 29, during a third step 103. The boss 32 is inserted by the second end 37, so that the annular collar 35 bears against the abutment surface 41 of the annular element 39 and thus blocks radial translation of the boss 32 in the first direction A. The third step 103 is for example illustrated in FIG. 6. In this example, the annular element 39 is positioned against the outer surface 25 of the wall 25 of the flame tube 24 and the boss 32 is inserted into the reception port 29 from the outside of the flame tube 24, so that the annular collar 35 blocks radial translation of the boss 32 toward the inside of the flame tube 24.

Then, during a fourth step 104, the second end 37 of the boss 32 is crimped to the wall 25 of the flame tube 24, so as to block radial translation of the boss 32 in the second direction B. The fourth step 104 is for example illustrated in FIG. 7. In this example, the second end 37 of the boss 32 is crimped against the inner surface 38 of the wall 25 of the flame tube 24, so that the crimping 37 blocks radial translation of the boss 32 toward the outside of the flame tube 24.

Once the boss 32 is installed and crimped to the wall 25 of the flame tube 24, the annular element 39 is for example welded at one or more points to the wall 25 of the flame tube 24 during a fifth step 105. In the example illustrated in FIGS. 5 to 7, the annular element 39 is welded to the outer surface 36 of the wall 25 of the flame tube 24.

Independently of steps 101 to 105, the insertion port 28 is drilled into the outer casing 20 during a sixth step 106, so that the insertion port 28 and the reception port 29 are facing one another. What is meant by "independently of steps 101 to 105" is the fact that the sixth step 106 can just as well be carried out before, in parallel with or even after steps 101 to 104.

Finally, during a seventh step 107, the flame tube 24 is positioned inside the outer casing 21 and the stem 27 of the attachment pin 26 is inserted first into the insertion port 28, then into the reception port 29 and the boss 32, until the head 30 bears against the outer surface 31 of the outer casing 21, thus ensuring precise positioning of the flame tube 24 in the combustion chamber 20.

Steps 101 to 107 are for example carried out several times or in parallel so as to position the flame tube 24 by means of several attachment pins 26, each associated with an insertion port 28, with a reception port 29, with a boss 32 and with an annular element 39 in the manner previously described. Preferably, the reception ports 29 are drilled in a plane P normal to the longitudinal axis 23. The reception ports 29 are advantageously distributed equidistantly in the plane P around the flame tube 24.

The replacement 200 of a worn boss 32 previously mounted on the wall 25 of the flame tube 24 according to steps 102 to 104, previously described, occurs according to the following steps illustrated in FIG. 8.

During a first step 201, the attachment pin 26 is removed from the insertion port 28, from the reception port 29 and from the boss 32.

Then the annular collar 35 of the boss 32 is removed during a second step 202, so that the boss 32 is free to translate in the first direction A. The annular collar 35 of the boss 32 is for example machined by milling or grinding. The second step 202 is for example illustrated in FIG. 9. In this example, the boss 32 is free to translate toward the inside of the flame tube 24.

The boss 32 is then removed from the annular element 39 and from the reception port 29 in the first direction A, during a third step 203. The third step 203 is for example illustrated in FIG. 10. In this example, the boss 32 is removed from the annular element 39 and from the reception port 29 toward the inside of the flame tube 24.

It is therefore not necessary to replace the annular element 39 when the associated boss 32 is worn. It is then understood that it is particularly advantageous, during manufacture of the combustion chamber 20, to weld at one or more points the annular element 39 to the wall 25 of the flame tube 24, once the boss 32 is crimped, so as to retain the proper positioning of the flame tub 24 relative to the outer casing 21 despite the replacement of the boss 32.

Finally, a new boss 32 is mounted to the wall 25 of the flame tube 24 in conformity with steps 103 and 104, previously described, and the associated attachment pin 26 is re-inserted into the outer casing 21 and the boss 32 in conformity with step 107 previously described.

The combustion chamber 20 described earlier thus has the advantage of comprising bosses 32 which are easily mounted and dismounted, at a lower cost, which still ensuring precise positioning of the flame tube 24 in the combustion chamber 20.

The invention claimed is:

1. A method for manufacturing a turbine engine combustion chamber comprising an annular outer casing extending along a longitudinal axis and a flame tube arranged inside the annular outer casing, the flame tube including an annular wall extending along the longitudinal axis, the method comprising:

drilling at least one reception port in the annular wall of the flame tube facing the annular outer casing;

installing at least one annular element coaxially with the at least one reception port against the annular wall of the flame tube;

inserting a boss into each of the at least one reception port and an associated annular element of the at least one annular element, the boss having a tubular body and comprising a first end and a second end, the first end of the boss, the tubular body and the second end of the boss being formed as a single element, the first end of the boss including an annular collar extending from the tubular body, an outer surface of the tubular body is connected to the annular collar by a fillet and an inner surface of the tubular body is connected to the annular collar by a flare, the first end of the boss being configured to block radial translation of the boss in a first direction, so that a surface of the annular collar of the boss bears against a first surface of the annular element at a first end of the annular element; and crimping the second end of the boss to the annular wall of the flame tube so that the second end of the boss is molded to and in contact with a concavity of an inner surface of the annular wall, the second end of the boss being configured to block radial translation of the boss in a second direction, wherein a second surface of the annular element at a second end of the annular element contacts the annular wall of the flame tube, and wherein the first surface and the second surface are parallel.

2. The method according to claim 1, further comprising, after crimping the second end of the boss, welding the annular element, at one or more points of the annular element, to the annular wall of the flame tube.

3. An assembly for a turbine engine combustion chamber, comprising:

a flame tube comprising an annular wall;

a boss for the turbine engine combustion chamber, the boss including a tubular body inserted into a reception port provided in the annular wall of the flame tube and configured to accommodate a stem of an attachment pin of the flame tube on an outer casing, a first end of the boss being formed by an annular collar extending from the tubular body, an outer surface of the tubular body being connected to the annular collar by a fillet and an inner surface of the tubular body being connected to the annular collar by a flare, the first end of the boss being configured to block radial translation of the boss in a first direction, and a second end of the boss being crimped to the annular wall of the flame tube so as to block radial translation of the boss in a second direction, the second end of the boss being molded to and in contact with a concavity of an inner surface of the annular wall, wherein the first end of the boss, the tubular body and the second end of the boss are formed as a single element; and an annular element arranged coaxially with the reception port and in radial contact with each of the annular wall of the flame tube and with the annular collar of the boss, the annular element comprising a first end and a second end, wherein a first surface of the annular element at the first end of the annular element contacts a surface of the annular collar, a second surface of the annular element at the second end of the annular element contacts the annular wall of the flame tube, and the first surface and the second surface are parallel to each other.

4. A turbine engine combustion chamber, comprising:

an annular outer casing extending along a longitudinal axis;

a flame tube arranged inside the annular outer casing and comprising an annular wall extending along the longitudinal axis, the annular wall comprising at least one reception port arranged facing the annular outer casing;

at least one attachment pin for the flame tube on the annular outer casing, the at least one attachment pin including a stem extending through the reception port;

at least one boss, the boss comprising a tubular body inserted into the reception port and accommodating the stem of the attachment pin, a first end of the boss being formed by an annular collar extending from the tubular body, an outer surface of the tubular body being connected to the annular collar by a fillet and an inner surface of the tubular body being connected to the annular collar by a flare, the first end of the boss being configured to block radial translation of the boss in a first direction, and a second end of the boss is crimped to the annular wall of the flame tube so as to block radial translation of the boss in a second direction, the second end of the boss being contoured such that the second end of the boss is molded to and in contact with a concavity of an inner surface of the annular wall, wherein the first end of the boss, the tubular body and the second end of the boss are formed as a single element; and at least one annular element arranged coaxially with the reception port and in radial contact with each of the annular wall of the flame tube and with the annular collar of the boss, the at least one annular element comprising a first end and a second end, wherein a first surface of the at least one annular element at the first end of the at least one annular element contacts a surface of the annular collar, a second surface of the at least one annular element at the second end of the at least one annular element contacts the annular wall of the flame tube, and the first surface and the second surface are parallel to each other.

5. The turbine engine combustion chamber according to claim 4, wherein the at least one annular element is welded at one or more points to the annular wall of the flame tube.

6. The turbine engine combustion chamber according to claim 4, wherein the at least one annular element is arranged against an outer surface of the annular wall of the flame tube, and the second end is crimped against the inner surface.

7. The turbine engine combustion chamber according to claim 4, wherein the second surface of the at least one annular element conforms to a shape of the annular wall of the flame tube.

8. The turbine engine combustion chamber according to claim 7, wherein the at least one annular element comprises a second collar forming the second surface, the second collar having a land intended to indicate to an operator an orientation of a contour of the second surface of the at least one annular element, and wherein the second collar is annular.

9. A turbine engine comprising the turbine engine combustion chamber according to claim 4.

* * * * *